No. 681,861.  
Patented Sept. 3, 1901.
H. E. SMITH.
SHAFT COUPLING.
(Application filed Jan. 26, 1901.)
(No Model.)  
2 Sheets—Sheet 1.
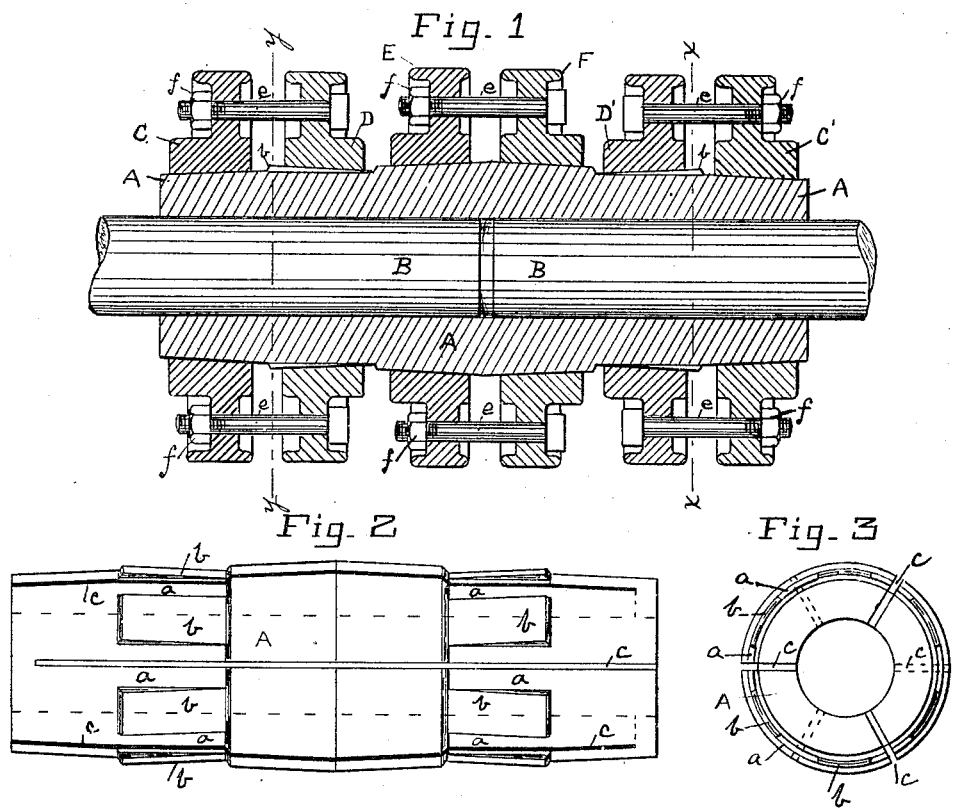
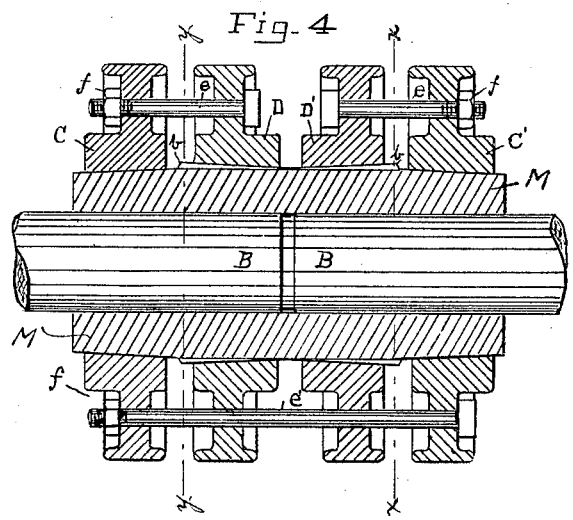
Witnesses  
Charles Dudley  
Henry E. Bushnell
Inventor  
Hobart E. Smith  
BY W. C. Lambert  
his ATTORNEY

UNITED STATES PATENT OFFICE.

HOBART E. SMITH, OF NEW HAVEN, CONNECTICUT.

SHAFT-COUPLING.

SPECIFICATION forming part of Letters Patent No. 681,861, dated September 3, 1901.

Application filed January 26, 1901. Serial No. 44,913. (No model.)

*To all whom it may concern:*

Be it known that I, HOBART E. SMITH, a citizen of the United States, and a resident of the city and county of New Haven, State of Connecticut, have invented certain new and useful Improvements in Shaft-Couplings; and I do declare the following specification, in connection with the accompanying drawings, forming a part thereof, to be a full, clear, and exact description of the invention, such as will enable others skilled in the art to which it appertains to make and use the same.

My invention relates to the general class of what are known as "compression" shaft-couplings, and has for its object the coupling of the abutting ends of two sections of shafting in such a manner that when the coupling is in position on the shafting the two abutting ends of the shafts will be firmly united and which, if so desired, may be quickly and readily uncoupled.

My invention consists in providing a sleeve bored centrally to fit the abutting shafts and having on its periphery a series of rightward and leftward conical surfaces, these conical surfaces having grooves formed longitudinally and of such numbers as may in practice be found desirable and of sufficient depth to allow the inwardly-projecting lands of hereinafter-mentioned collars to mesh with the grooves and when so meshed allowing the collars to pass over the conical surfaces of the sleeve. These grooves are spaced and formed so that the remaining lands will be of approximately the same width as the grooves. At points in a given end of the sleeve I cut longitudinal slots entirely through to the bore and nearly to the other end of the sleeve. Diametrically opposite and midway between these slots and from the opposite ends of the sleeve I also cut longitudinal slots in the same manner. The resultant effect of cutting these slots through the metal to the bore and nearly to the ends of the sleeve is to make the sleeve sufficiently elastic to yield readily to pressure from without, and thus more firmly grip the shafts. Upon each of the conical tapering surfaces of the sleeve I fit collars of such an internal diameter that when contact is formed between the sleeve and collars there will be a space left between each series of collars. In the taper bore of the collars D D' are lands of an equal number to the grooves in the sleeve.

In the accompanying drawings similar letters of reference indicate similar parts.

Figure 5:
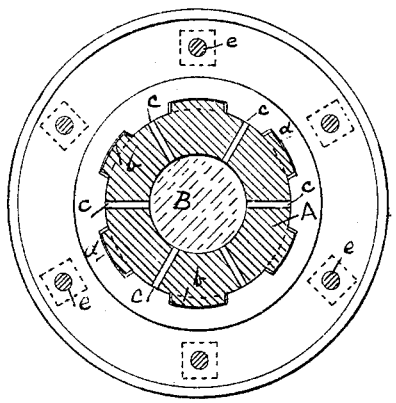
Figure 6:
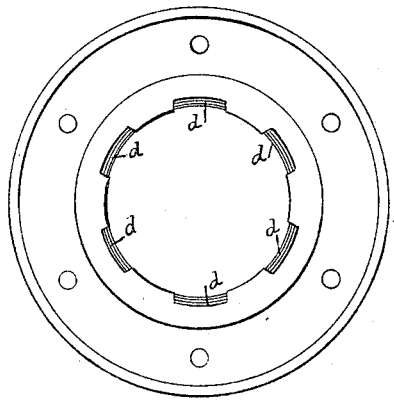
Figure 7:
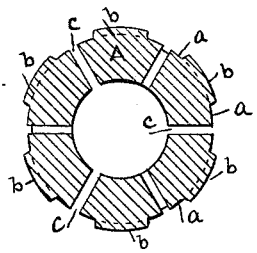
Figure 8:
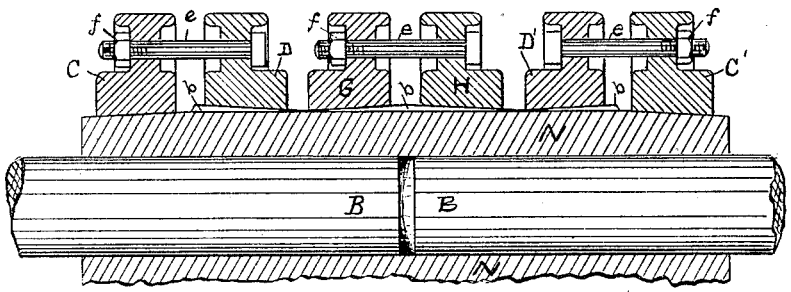

Figure 1 is a vertical longitudinal section through the center of the shaft-coupling. Fig. 2 is a plan view of the conical tapering sleeve. Fig. 3 is an end view of the same. Fig. 4 is a vertical longitudinal section through the center of the shaft-coupling, showing a modified form of construction. Fig. 5 is a transverse vertical section on the plane indicated by the line $x\,x$ of Figs. 1 and 4, showing the collar D on the sleeve A or M and before it is revolved, so that it may slide into position on sleeve A or M. Fig. 6 is an elevation of the face of one of the collars D D' as removed from the sleeve and showing the grooves $d\,d$. Fig. 7 is a transverse section of the sleeve on the plane indicated by the line $y\,y$ of Figs. 1 and 4. Fig. 8 is a vertical longitudinal section through the center of the shaft with the lower portion broken away, showing another modified form of construction.

Referring to the drawings, A, M, and N are centrally-bored sleeves having right and left conical surfaces, grooves $a\,a$ formed in these surfaces with the remaining lands $b\,b$, and slots $c\,c$ cut through to the bore.

B B are the abutting ends of two sections of shafting.

C C' are outside taper-bored collars.

D D' are inside taper-bored collars having the grooves $d\,d$ formed in the taper bore and adapted to mesh with the lands $b\,b$ of the sleeve.

$e\,e\,e'\,e'$ are screw-threaded bolts and provided with nuts $f\,f$ to force the collars C and D nearer together.

E and F, Fig. 1, are collars of the same general construction as the outside taper-bored collars C and C'.

G and H, Fig. 8, are taper-bored collars similar to the inside collars D D'.

I have shown in Figs. 4 and 8 modified forms of construction of my improved coupling, Fig. 4, having four collars on the conical surfaces of the sleeve instead of six, as are shown in Figs. 1 and 8. This modified form may be used for lighter shafting than that shown in Figs. 1 and 8; but the same method of construction is followed in both forms, and it will be readily seen that I may also use more collars than I have shown in Figs. 1 and 8 without altering the substance of my invention.

I will now proceed to describe the process of assembling the coupling and applying the same to the shafts, and also show the purpose of the grooves and lands. In a coupling as shown in Fig. 1 collars C, D, and E having been placed on a section of shafting in the order named collars C', D', and F are then in the same order placed on the other section of shafting. The sleeve A is then slid over the ends of the shafts B B. Collars E and F are then passed over the exterior surfaces b b of the sleeve until contact is formed with the conical tapering surfaces of the sleeve. Any convenient number of screw-bolts e e are then passed through openings provided, and by tightening the nuts on the bolts the sleeve is compressed on the shaft, as hereinafter mentioned and described. Collars D D' are then from opposite ends mounted upon the sleeve in such manner that the lands formed on the sleeve will enter the grooves which are in the taper bore of the collars, thus allowing the collars D D' to be moved longitudinally on the surface and over the larger diameter of the sleeve to such a position that the collars D D' may be freely revolved on the exterior surface of the sleeve. In this position a partial revolution of the collars D D' to a distance equal to the width of the lands formed on the outer surface of the sleeve will bring the lands of the collars opposite and contiguous to those of the sleeve. Collars C and C' are then mounted in position on the sleeve and the tightening of the nuts f f on the screw-bolts e e will draw the collars C D, C' D', and E F nearer together and by means of the conical surfaces on the sleeve will compress the sleeve upon the surface of the shafts with a pressure sufficient to unite the several parts firmly together.

It will be readily seen that it would be impossible to assemble the inner taper-bored collars D and D' in their proper position on the sleeve without these grooves and in connection with the grooves which are on the conical surfaces of the sleeve.

In the form of coupling as shown in Fig. 4 I show long screw-bolts e' e' as passing from and through one outside collar C through the inside collars D and D' to the opposite outside collar C'. In using these longer bolts they are alternated with shorter screw-bolts e e, and by thus using these bolts as described I am enabled to secure a better alinement of the different parts of the coupling and at the same time imparting extra rigidity to the sleeve A, M, or N. I do not wish to be understood in the form of coupling described as limiting or confining myself to the use of these longer bolts, as in ordinary practice the sleeve in combination with the collars and shorter bolts will be of sufficient strength to secure the necessary effect.

Having thus described my invention, what I claim as new, and desire to secure by Letters Patent, is—

1. In a compression-shaft coupling, the combination of a centrally-bored sleeve, adapted to be fitted to abutting shafts, and having on its periphery a series of rightward and left-ward conical surfaces, longitudinal grooves formed in these conical surfaces with accompanying lands, alternating slots cut through to the bore and nearly to opposite ends, with taper-bored collars fitted to the conical surfaces of the sleeve, the inside collars having grooves formed longitudinally in their taper bore, and screw-bolts and nuts for the purpose and substantially as shown and described.

2. In a shaft-coupling, the combination of a centrally-bored sleeve A M or N having on its periphery a series of rightward and left-ward conical surfaces, longitudinal grooves a a formed in these conical surfaces, slots c c cut alternately from opposite ends, taper-bored collars C C' fitted to the conical surfaces of the sleeve, taper-bored collars D D' G H fitted to the conical surfaces of the sleeve, said collars D D' having grooves d d formed in their taper bore, these grooves adapted to mesh respectively with the lands b b of the sleeve, and when thus meshed allowing the collars to pass longitudinally over the outer surfaces of the sleeve to a predetermined position and when mounted in this position, capable of being revolved so that the conical surfaces of the sleeve and collars will be in contact substantially as shown and described.

3. In a shaft-coupling, the combination of a sleeve having on its periphery rightward and leftward conical surfaces, the central conical surface of such a diameter as will adapt it to collars which may be passed over the outer conical surfaces of the sleeve, longitudinal grooves in these outer conical surfaces, slots cut through to the bore for the purpose of rendering it more elastic, with the taper-bored collars C D C' D', of which collars D D' have longitudinal grooves formed in their taper bore and adapted to be fitted to the conical surfaces of the sleeve, and screw-bolts and nuts for the purpose and substantially as shown and described.

4. In a shaft-coupling, the combination of a sleeve A, taper-bored collars C C' D D' with the longitudinal grooves a a, lands b b, slots c c cut in the sleeve, and of long screw-bolts e' e' passing from the outer collars C C' and through the inner collars D D' and the opposite outer collars C' C, these long bolts alternating with shorter screw-bolts e e, both series of bolts having their accompanying nuts for securing and alining the same together for the purpose and substantially as described.

In testimony whereof I affix my signature in presence of two witnesses.

HOBART E. SMITH.

Witnesses:
WILBUR C. LAMBERT,
HENRY E. BUSHNELL.